United States Patent [19]

Imhoff

[11] Patent Number: 5,053,778

[45] Date of Patent: Oct. 1, 1991

[54] GENERATION OF TOPOGRAPHIC TERRAIN MODELS UTILIZING SYNTHETIC APERTURE RADAR AND SURFACE LEVEL DATA

[75] Inventor: Marc L. Imhoff, College Park, Md.

[73] Assignee: The United States of America as represented by the Administrator of the National Aeronautics and Space Administration, Washington, D.C.

[21] Appl. No.: 391,896

[22] Filed: Aug. 10, 1989

[51] Int. Cl.⁵ .............................................. G01S 13/89
[52] U.S. Cl. ...................................... 342/191; 342/25; 342/26
[58] Field of Search ...................... 342/191, 52, 25, 26, 342/123

[56] References Cited

U.S. PATENT DOCUMENTS

| | | | |
|---|---|---|---|
| 3,076,189 | 1/1963 | Goddard | 342/52 |
| 3,191,170 | 6/1965 | Lustig et al. | 342/191 |
| 3,614,778 | 10/1971 | Graham | 342/25 |
| 3,641,484 | 2/1972 | White et al. | 342/191 X |
| 3,806,795 | 4/1974 | Morez | 342/22 X |
| 4,050,067 | 9/1977 | Elmore, Jr. | 342/191 |
| 4,101,891 | 7/1978 | Jain et al. | 342/25 |
| 4,144,571 | 3/1979 | Webber | 342/63 |
| 4,148,027 | 4/1979 | Nowogrodzki | 342/104 |
| 4,184,155 | 1/1980 | Silvertson, Jr. | 342/25 |
| 4,321,601 | 3/1982 | Richman | 342/25 |
| 4,355,311 | 10/1982 | Jain | 367/88 X |
| 4,359,732 | 11/1982 | Martin | 342/191 |
| 4,495,500 | 1/1985 | Vickers | 342/191 X |
| 4,509,048 | 4/1985 | Jain | 342/25 |
| 4,630,051 | 12/1986 | Adams et al. | 342/133 |
| 4,675,677 | 6/1987 | von Maydell et al. | 342/25 |
| 4,706,199 | 11/1987 | Guerin | 342/191 X |
| 4,715,005 | 12/1987 | Heartz | 364/521 |
| 4,727,373 | 2/1988 | Hoover | 342/25 |
| 4,727,374 | 2/1988 | Boulais | 342/50 |
| 4,758,838 | 7/1988 | Maeda et al. | 342/25 |
| 4,780,718 | 10/1988 | Hudson et al. | 342/25 |
| 4,937,580 | 6/1990 | Wills | 342/22 |

Primary Examiner—John B. Sotomayor
Attorney, Agent, or Firm—R. Dennis Marchant; Harold W. Adams; Paul S. Clohan

[57] ABSTRACT

Topographical terrain models are generated by digitally delineating the boundary of the region under investigation from data obtained from an airborne synthetic aperture radar image and surface elevation data concurrently acquired either from an airborne instrument or at ground level. A set of coregistered boundary maps thus generated are then digitally combined in three dimensinoal space with the acquired surface elevation data by means of image processing software stored in a digital computer. The method is particularly applicable for generating terrain models of flooded regions covered entirely or in part by foliage.

17 Claims, 8 Drawing Sheets

007
GENERATION OF TOPOGRAPHIC TERRAIN MODELS UTILIZING SYNTHETIC APERTURE RADAR AND SURFACE LEVEL DATA

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to terrain mapping and more particularly to the generation of multi-dimensional topographical terrain models of the earth's surface such as forested regions which have an underlying surface which is periodically flooded or includes a water surface of varying elevation.

Wetland forests and Mangrove or wet coastal forest ecosystems are an important resource throughout the tropic and subtropic regions of the globe. As a whole, these formations account for a significant share of the forested coast lines and river flood plains of these regions and are an important source of biological productivity. By providing environments for abundant plant, algal, and marine and terrestrial animal life these ecosystems figure Prominently in the cycling of organic matter.

A critical environmental factor in the formation, health, and status of these ecosystems is the surface hydrology, the two most important factors of which are the water level dynamics and water chemistry. Both of these factors are critically interactive with the geomorphology or substrate topography upon which flood plain forests and mangroves evolve. The topographic contour of the floor of these forests, moreover, determines the frequency of the flooding and the chemistry of the flood waters and thus the productivity and health of the forest and the utility of the soils.

Heretofore, generation of contour maps or obtaining terrain information of forested regions relied solely upon leveling survey measurements acquired on the ground. This meant that a team of surveyors actually had to enter the area and take required measurements. Aerial survey was impossible as the terrain is hidden by the forest canopy. Ground survey is a very tedious and expensive process that requires total and long term access to the area of interest. Also, many of the world's coastal forests, river deltas and flood plains are not readily accessible. These include the mouths of the Ganges river, the Amazon basin, the Mississippi delta, and the Mekong delta, to name a few. In addition to being very time consuming, such efforts are extremely tedious, require many people, extensive travel and logistics, and often access to the areas to be surveyed is impossible because they lie in a politically sensitive area.

While terrain modeling and foliage penetration using a synthetic aperture radar is generally known and can also be used to remotely determine water level given the use of special "in situ" devices, radar derived flood boundary maps combined with tide and hydrology data is not known to have been used to generate topographic models of subcanopy surface areas which periodically change due to the water surface variation caused bY the changes in the water level in the region of concern.

SUMMARY

It is an object of the present invention, therefore, to combine synthetic aperture radar data with other known surface information to generate a topographic image of a geographical surface area.

It is a further object of the invention to combine synthetic aperture radar images of the earth's surface obtained from an airborne radar with concurrently acquired tide surface information to generate a digital terrain model of a predetermined water surface area.

It is another object of the subject invention to utilize synthetic radar imagery for generating topographic information of a subcanopy flooded surface area by combining the radar derived boundaries of inundated water surface areas with concurrently obtained surface elevation data.

And yet another object of the invention is to generate a multi-dimensional terrain model of a certain region of the earth for use in determining tidal flow and eventual nutrient transport from a forested area to a marine or river ecosystem by combining data acquired by synthetic aperture radar making periodic passes over the area under investigation and combining it with known water levels acquired either from the ground or from above. This can also be used to monitor flood damage and the effect of ground subsidence or rising sea levels.

Briefly, the foregoing and other objects are achieved by a method and apparatus for generating topographical terrain models by delineating the boundary of the region under investigation by data obtained from an airborne synthetic aperture radar. The radar data from an airborne radar platform is thereafter combined with concurrently obtained surface information to generate a digital terrain model via a digital computer. Of particular concern are forested regions having an underlying variable water surface area, but of equal importance are river flood plains of low relief and other types of vegetated areas. The dominance of the interaction phenomenon, the canopy to surface or surface to canopy reflection in a flooded forest is utilized to create subcanopy flood boundary maps for at least two different time periods. The boundary maps are then digitally combined in three dimensional space with acquired water surface elevation data by means of image processing software stored in a digital computer.

BRIEF DESCRIPTION OF THE DRAWINGS

The following detailed description of the invention will be more readily understood when considered in conjunction with the accompanying drawings wherein.

DETAILED DESCRIPTION OF THE INVENTION

Figure 1:
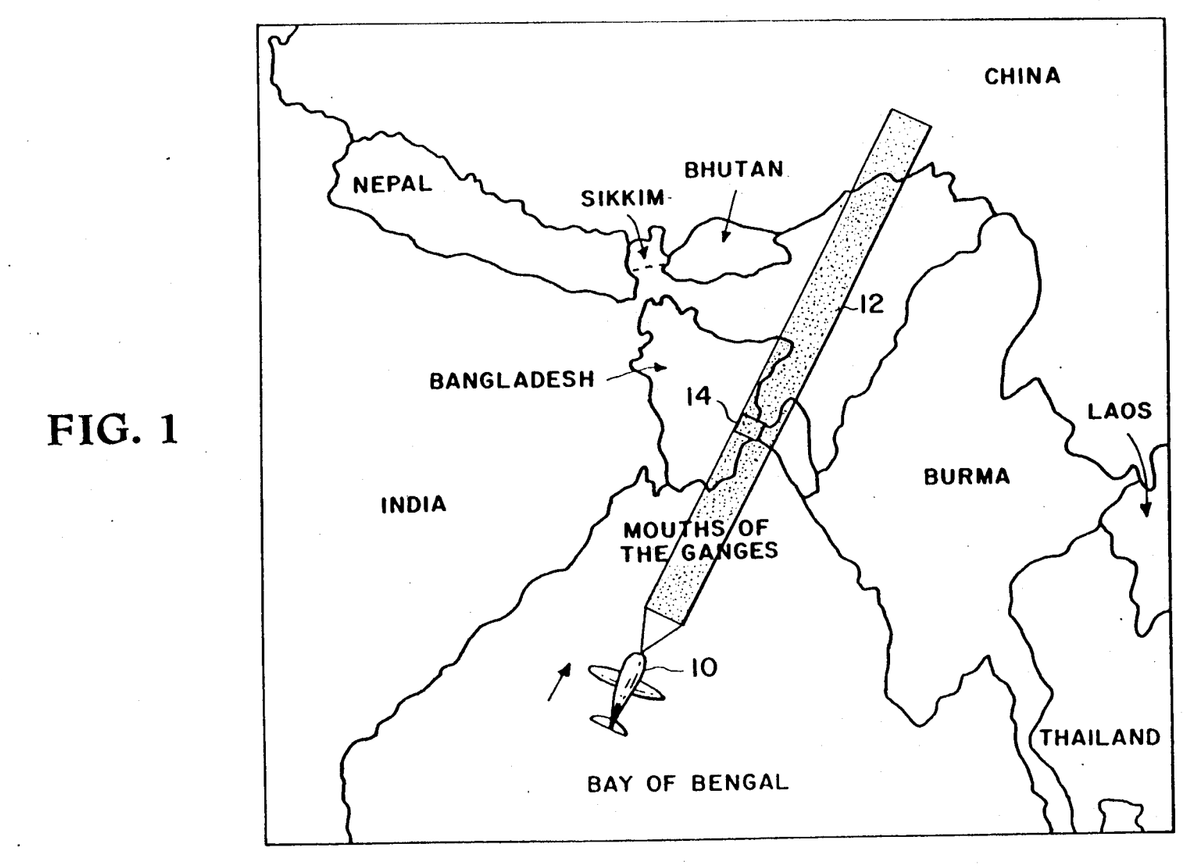
FIG. 1 is a diagram illustrative of the manner in which radar data is acquired in accordance with the subject invention.

Referring now to the drawings wherein like reference characters refer to like elements, FIG. 1 discloses a radar platform 10 which may be, for example, a space shuttle, airplane, or satellite which carries a synthetic aperture radar (SAR), not shown. Synthetic aperture radar comprises apparatus well known to those skilled in the art and preferably comprises an L-band, P-band or C-band radar having quad polarization or any combination of HH, VV, HV, VH, RC, LC polarizations and which is capable of penetrating vegetation, particularly tree foliage and which operates with an incidence angle which ranges between 25° and 57°. The radar generates an image, preferably but not necessarily, at the same incidence angle of the earth's surface along a relatively narrow strip 12 during a pass over the area of interest during an orbital flight. As shown in FIG. 1, the flight path proceeds from the Bay of Bengal to the mouth of the Ganges river where it passes over Bangladesh and then continues northward over China. Reference numeral 14 comprises a survey site located, for example, at the mouth of the Ganges river in southern Bangladesh.

In the subject invention, SAR surface image data is acquired over the survey site 14, typically but not restricted to, 70km by 40 km, at predetermined time intervals, for example, different stages of inundation of a forest region caused by flooding. The period of time involved, however, is selective and can be hours, for example, for tides and days or months and even years for seasonally flooding rivers. Simultaneously with the SAR data acquisition, ground water level measurements are acquired in situ from a plurality of gauges or other type of depth measuring devices located at one or more, typically at least five stations 16 within the survey area, or it is acquired remotely by means of radar altimetry. When desired, conventionally acquired leveling survey transect data within the survey area and obtained by making elevation measurements every 30 meters, for example, for a distance of 1200 meters can also be incorporated into the model generation in order to obtain enhanced accuracy. The water elevation data thus acquired are then entered into a digital computer where stored routines, hereinafter described, generate one or more surface models. The radar images are then geometrically matched to the water surface models by being digitally coregistered therewith using, typically, a first order polynomial interplation algorithm by means of the computer software from which three dimensional surface models are generated.

The method of the subject invention includes three major processes which are: digital filtering, bit masking and interpolation. The radar data is converted to statistical data for a plurality of test sites on the ground where it is processed digitally through the use of spatial filters to generate one or more relative brightness maps. The maps are divided into brightness classes with the division being made based on either a statistically significant break point or on ground data indicating a place which corresponds to a place on the SAR image where an actual flooded or non-flooded boundary is located within the survey area. This division then results in a flood boundary map being generated for the area under consideration and is performed for each radar image generated. The flood boundaries for each image data set are next stripped off using bit masking or a boundary tracing algorithm. These boundaries are then multiplied to the appropriate water elevation surface models to generate real elevations from the boundaries. The new elevation data from one or more such boundaries are then compiled into a single composite image map. An interpolation algorithm is then performed on the composite elevation data to generate a digital three dimensional elevational model. With this technique, contour maps, perspective views, or a variety of volume and topographic products are selectively generated.

Figure 2:
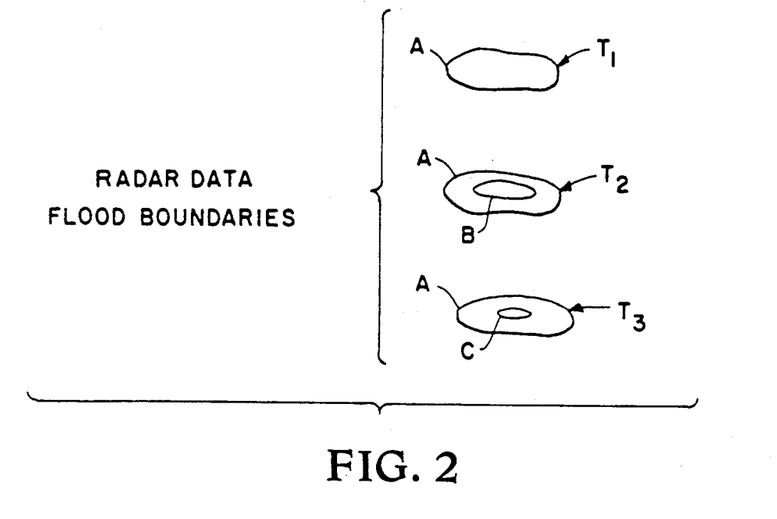
FIG. 2 is a diagram illustrative of radar flood boundaries acquired at three different time intervals for a predetermined region.
Figure 3:
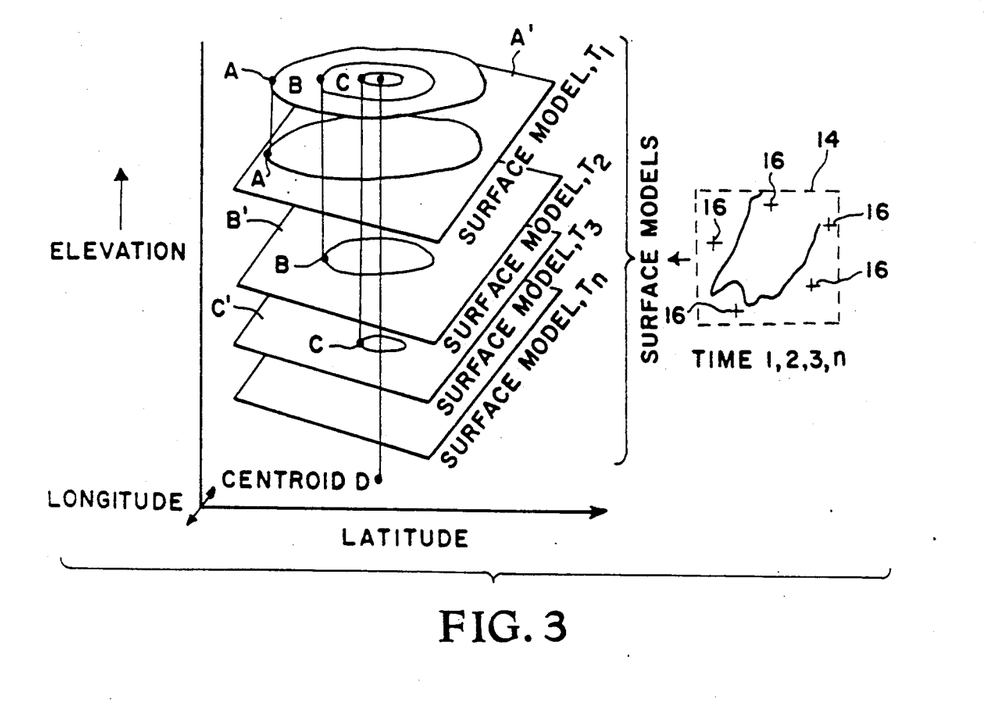
FIG. 3 is a diagram illustrative of the merging of the radar derived flood boundaries shown in FIG. 2 and concurrently acquired water elevational data for generating topographic contour map in accordance with the subject invention.
Figure 4:
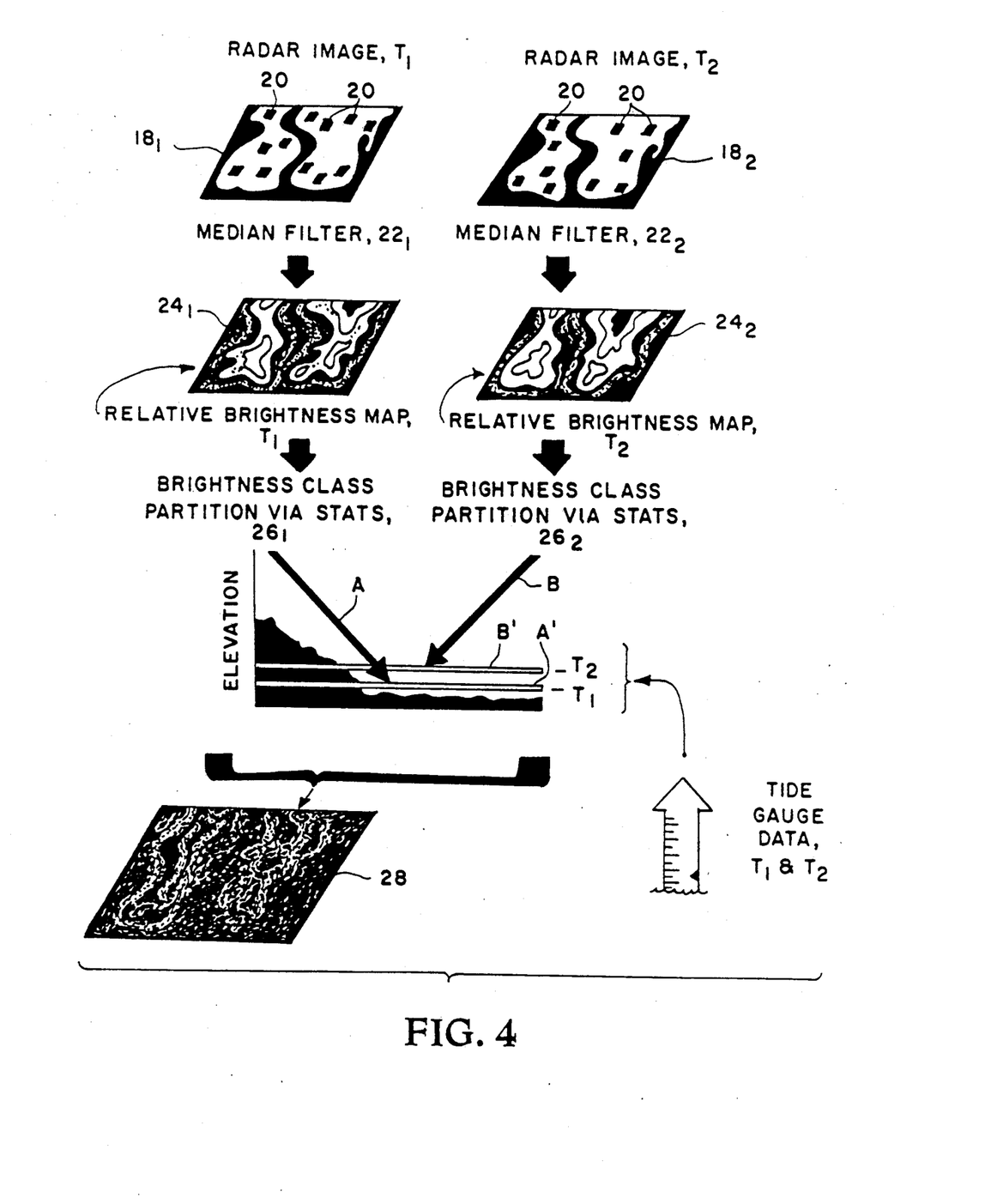
FIG. 4 is a diagram further illustrative of the merging of radar derived flood boundaries with water elevational data.

This procedure is illustrated in FIGS. 2, 3 and 4. Referring now to FIG. 2, shown thereat are three flood boundaries generated from SAR radar image data of the survey site 14, for example at three different time intervals $T_1$, $T_2$ and $T_3$. At the time $T_1$, a flood boundary A is produced, whereas at the time $T_2$, a flood boundary B is generated which is relatively smaller than the flood boundary A. This is indicative of less flooding in the area at the time $T_2$. At the time $T_3$, the flood waters have receded even more, generating a flood boundary C which is shown in relation to the largest flood boundary A.

In the invention, the three flood boundaries A, B and C generated are mutually centered as shown in FIG. 3 on the centroid D where they are merged with water surface models A', B' and C' generated from the ground surface data concurrently obtained at a plurality of test sites or stations 16 at the times $T_1$, $T_2$ and $T_3$ which coincide with the times the radar images for the flood boundaries A, B and C were generated. The merged image data is then used to generate a three dimensional topographic terrain model of the region 14 or a portion thereof as shown, for example, in FIG. 4.

Referring now briefly to FIG. 4, shown thereat are two radar images $18_1$ and $18_2$ which are generated at the times $T_1$ and $T_2$, respectively. A plurality of test sites 20 are located on the SAR radar images $18_1$ and $18_2$ from which statistics are generated. The radar images are then spatially filtered by median or other statistics based filters $22_1$ and $22_2$. Relative brightness maps $24_1$ and $24_2$ are next generated for the times $T_1$ and $T_2$. The brigness maps $24_1$ and $24_2$ are partitioned into brightness classes at $26_1$ and $26_2$ in response to the statistics acquired from the test sites 20 from which the flood boundary images A and B (FIG. 2) are generated. These boundaries are then merged with the water surface models A' and B' to generate a final composite three dimensional terrain model 28.

Figure 5A:
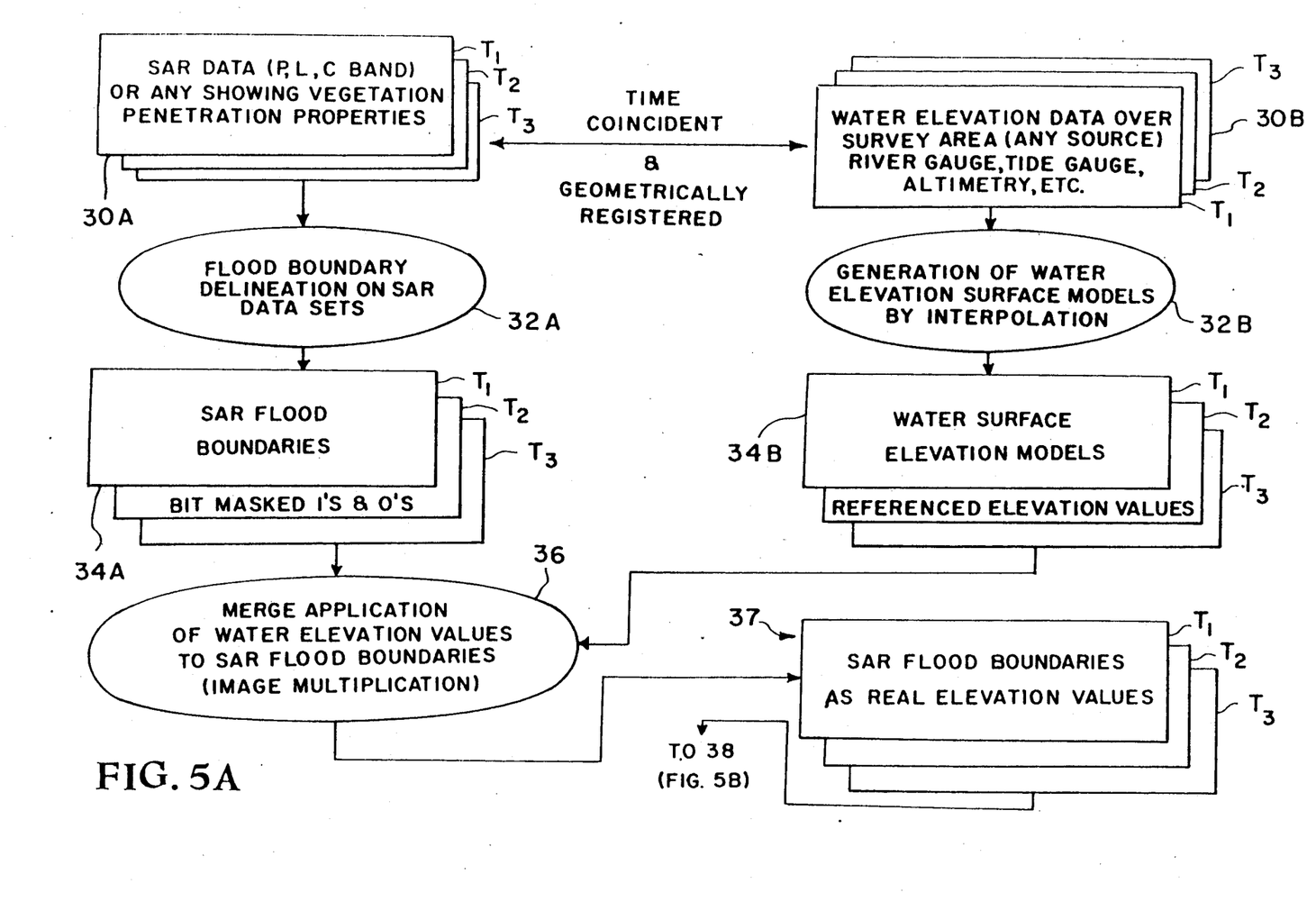
FIGS. 5A and 5B are diagrams illustrative of the preferred method of the subject invention.
Figure 5B:
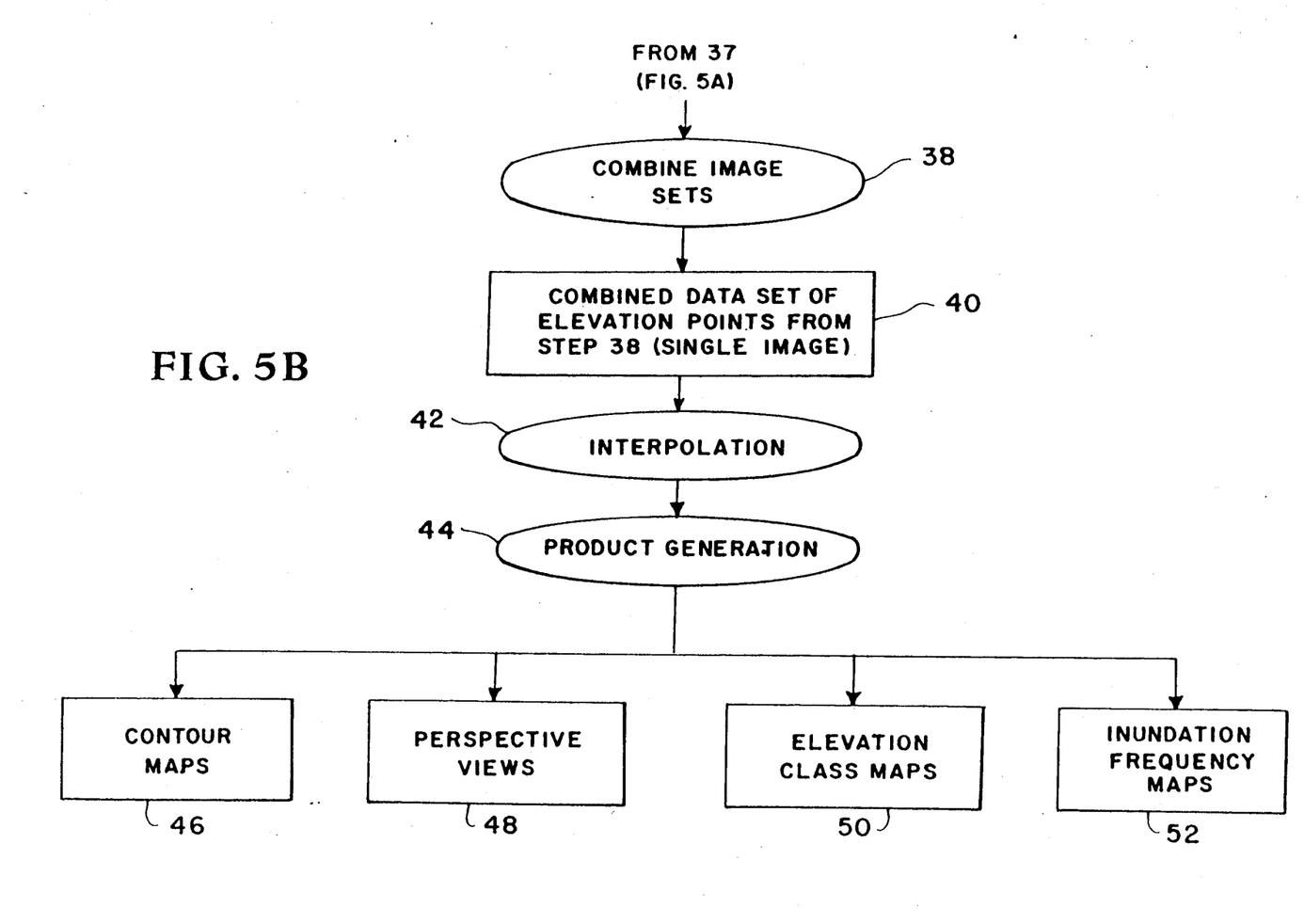

Further details of the method and the computer software for implementing the topographic terrain model generation will now be considered. As depicted in FIGS. 5A and 5B, the initial steps involve mutually separate processes as they relate to the SAR image data and to the water elevation data. At three different times $T_1$, $T_2$ and $T_3$, the SAR acquires three separate data sets over the survey area 14 as indicated at 30A. The SAR operates in a frequency range which has vegetation penetration properties. The data is collected in or converted to the digital domain for image manipulation purposes. Although one set of data for a time $T_n$ will suffice in certain instances, two or more data sets are preferred and are acquired at times where different water levels due, for example, to flooding, tides or seasonal hydrological regimes are in effect. As noted earlier, the time interval between SAR data acquisitions can be hours, months, or even years. The radar images are also geometrically coregistered so that a statistical analysis can be performed on a single geographic definition of a test site in the areas on the imagery.

The initial step 30A of acquiring the SAR data is followed by two steps 32A and 34A where flood boundary delineation and flood boundary images are generated. These two steps are shown in further detail in FIG. 6.

Figure 6:
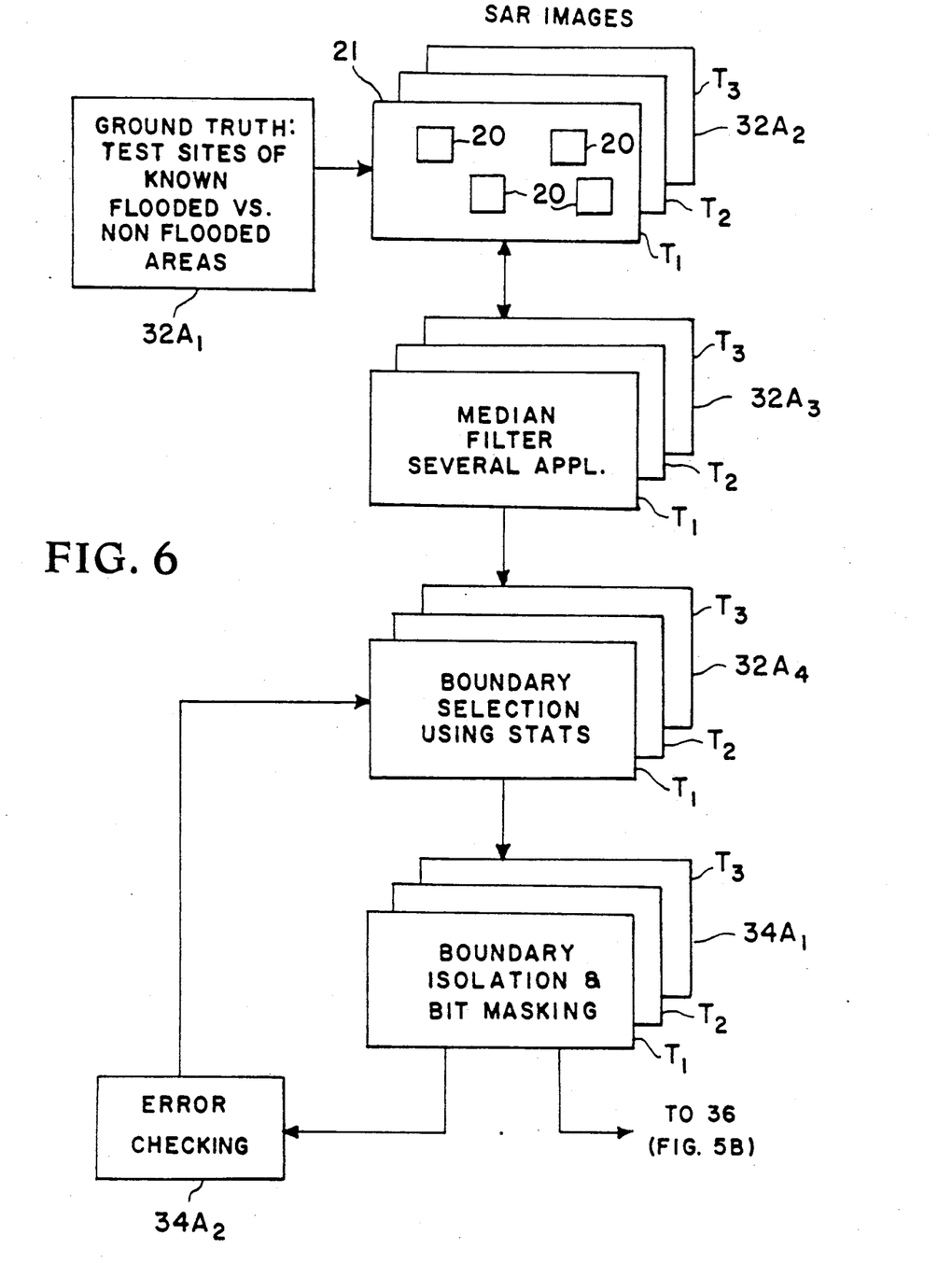
FIG. 6 is a diagram further illustrative of a portion of the method shown in FIGS. 5A and 5B.

Referring now briefly to FIG. 6, step $32A_1$ designates a preliminary step used for providing accurate flood boundary delineation and comprises what is referred to as the acquisition of ground truth or on-site observations. Although not always necessary, ground truthing provides a higher level of confidence in the accuracy of flood boundary delineation on the SAR images generated. To implement ground truth, a predetermined number of test sites 20 are located on the SAR image 21 where sub-canopy or flood plain conditions can be verified on the ground, i.e., flooded vs. non-flooded states during SAR data acquisition. In forested areas, the test sites 20 are selected that represent the major forest types and in topographic areas that will yield flooded and non-flooded examples for each set of SAR data. Statistics are then generated for digital analysis of the sites 20 in step $32A_2$. Following step $32A_2$, several techniques can be utilized to define flood boundaries, one being controlled density slicing. Another is the use of polarization signature analysis to determine the presence of a two or multiple bounce signature (flooded area) verses a single bounce (non-flooded area) signature. This obtains for a flooded canopy; however, these relationships may be reversed for non-forested areas and open water.

Controlled density slicing involves a statistical analysis of the SAR image pixel values within the designated ground truth test sites 20 and includes means for determining: means, medians, standard deviations, etc. Following this, the data is subjected to spatial filtering as shown in step $32A_3$ of FIG. 6. Since vegetated areas are of concern, a median or mean guided spatial filter is provided to fit a predetermined regional scale such as $5\times5$, $7\times7$, or $11\times11$ meters, where each element is approximately 25 meters square for forested areas with relatively homogeneous stands and applied to the SAR data sets. In any event, the size of these filters are determined by the size of the forest and the resolution of the radar. This yields a fine density pattern over the image. Statistics can again be regenerated on the sites 20 after filtering for a simpler approach to determining flood boundaries.

Next a boundary point selection and gradient remapping step $32A_4$ is performed using a gray scale separation using the test site statistics generated either in step $32A_2$ or $32A_3$. The flood boundary is delineated as being the mid-Point value between flooded and non-flooded grouped means or medians. A generic gray scale density slicing routine is used to separate classes into flooded vs. non-flooded categories by remapping the images into two classes above and below a statistical boundary. Following this, a boundary isolation step $34A_1$ is performed where the boundaries are prepared for subsequent merger by bit masking, i.e. the flood boundary image pixels are assigned the digital values of 1 and all others 0. An error checking step $34A_2$ is also shown. This is performed where any values greater than 1 indicate overlap Problems and the step $32A_4$ is repeated, if necessary. Following the boundary isolation and bit masking step of 34A, the flood boundary images are merged with water elevation values as shown in step 36 of FIG. 5.

Referring now back to FIG. 5A, step 30B is intended to designate that water elevation data is also being acquired over the survey area at the same time that SAR data is being obtained as shown in FIG. 1. The location of the water level measurements with respect to the survey site and the SAR image data is known and comprises the sites 16 in the survey area 14. In order to generate a first order trend surface, three or more sites distributed over the survey site are preferred. The water level data is acquired and extracted to match the time $T_1$, $T_2$ and $T_3$, for example, of the SAR image data acquisition shown in step 30A.

Next step 32B is performed, which comprises the generation of water surface models. To accomplish this, water elevation data is converted into a digital image format to form a grid. Elevation values are then interpolated by an interpolation routine, with elevation images being generated as shown by step 34B, which is illustrative of the elevation of the water surface over the entire area. This procedure is applied to each elevation data set corresponding to the SAR data acquisition sets and are registered geometrically with the SAR generated images relative to a common base, the common base being, for example, the centroid D shown in FIG. 3. Any standard or custom map projection, however, can be utilized, when desired.

With the generation of the water surface elevation models, a merger of the SAR flood boundaries with the water surface elevation models is shown by step 36, whereby each SAR boundary set is converted to real elevation values by matching it to its appropriate water surface elevation model. This is accomplished by known digital data processing techniques. For example, the results obtained by the flood boundary generation step 34A is multiplied in the image domain with the respective counterparts of the water elevation models generated in step 34B. The SAR flood boundaries which have a digital value of 1 will acquire the appropriate elevation values from the water elevation image. All other values being 0 will retain the value of 0. Step 36, moreover, is repeated for all SAR flood boundaries and water surface images over the desired time intervals, for example, the times $T_1$, $T_2$ and $T_3$. It should also be noted that the interface between land and water for islands can also be acquired in the same way.

Referring now to FIG. 5B which comprises an extension of FIG. 5A, reference numeral 38 is indicative of the step wherein the results of steps 36 and 37 are combined into a composite data set from which a single composite image 40 can be generated. The new data set comprises image data containing real elevation points over the survey area based on the SAR flood boundary and elevation data set merger. Error checking can further be utilized, when desired, to eliminate bad data. An interpolation algorithm is further performed on the results obtained in steps 36 and 37 in the generation of the composite image as shown by step 42. The result obtained is a complete terrain image of the survey site based on the SAR and water elevation data acquired over the time intervals selected.

Reference numeral 44 indicates a step of product or image generation which can take many forms, several of which are shown comprising contour maps 46, perspective views 48, elevation class maps 50 and inundation frequency maps 52, to name a few. Such maps can be used for forest productivity modeling in forest areas, development planning, disaster management and hydrological modeling, etc.

Since any type of SAR polarization, e.g. HH, HV, VV or VH can be used, when desirable, polarization signature analysis may be used for defining the flood boundaries. This technique involves the identification of flood boundaries by verification of a single bounce vs. a two-bounce polarization signature. All zones exhibiting a strong two bounce return can be considered flooded in vegetated areas. A specular or single bounce may indicate open water in non-vegetated areas. Once the signature has been determined, these areas can be classified by well known generic classification procedures. The flood boundary is then determined to be an image element where a strong two bounce signature gives way to other non-indicative signatures, i.e., anything other than two bounce signatures.

The method outlined in FIGS. 5A and 5B as well as FIG. 6, can, when desirable, be implemented by a software package entitled, "Land Analysis System (LAS)" developed by and for the Goddard Space Flight Center, National Aeronautic and Space Administration. This computer software includes a series of programs or routines which digitally operate on both the SAR data and the water elevation data acquired in order to generate the required terrain models from the water surface elevation models and SAR derived flood boundaries.

Figure 7A:
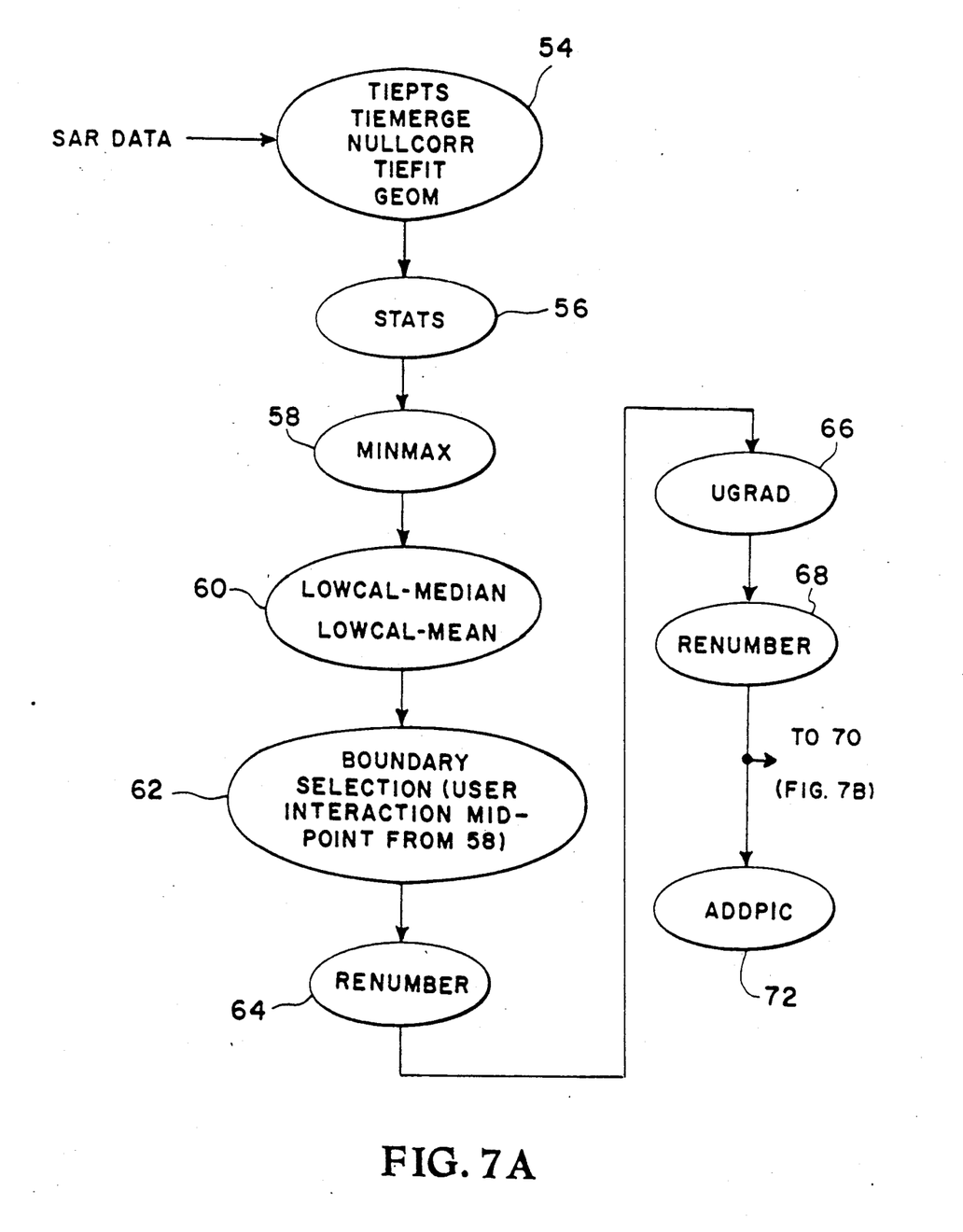
FIGS. 7A and 7B are illustrative of a flow chart of computer software for implementing the method shown in FIGS. 5A and 5B.

Referring now to FIG. 7A, reference numeral 54 designates five programs which operate on the acquired SAR data for coregistering the SAR data sets to a common geographical base. These programs are shown entitled: TEIPTS, TEIMERGE, NULLCORR, TIEFIT and GEOM. Next the data is fed to a STATS program 56 to delineate the test sites on the SAR images generated. Next a MIN-MAX program 58 generates statistics for the test sites delineated. This is followed by a two program set 60 identified as LOWCAL-MEDIAN and LOWCAL-MEAN which spatially filters the radar data This is followed by boundary selection using the results from the MIN-MAX program 58, which can be reapplied to the process at 62, if desired, and the boundary gradients are defined by a RENUMBER routine 64. The boundary locations on the images are next generated using the program identified as UGRAD 66 which is again followed by another RENUMBER routine 68 which bit masks the boundary to digital number 1's and 0's. This data is now fed to a merging program 70 shown identified as MULTIPLY in FIG. 7B. An ADDPIC program 72 is also included as shown in FIG. 7A in order to perform error checking on the water boundary data generated at 68.

Figure 7B:
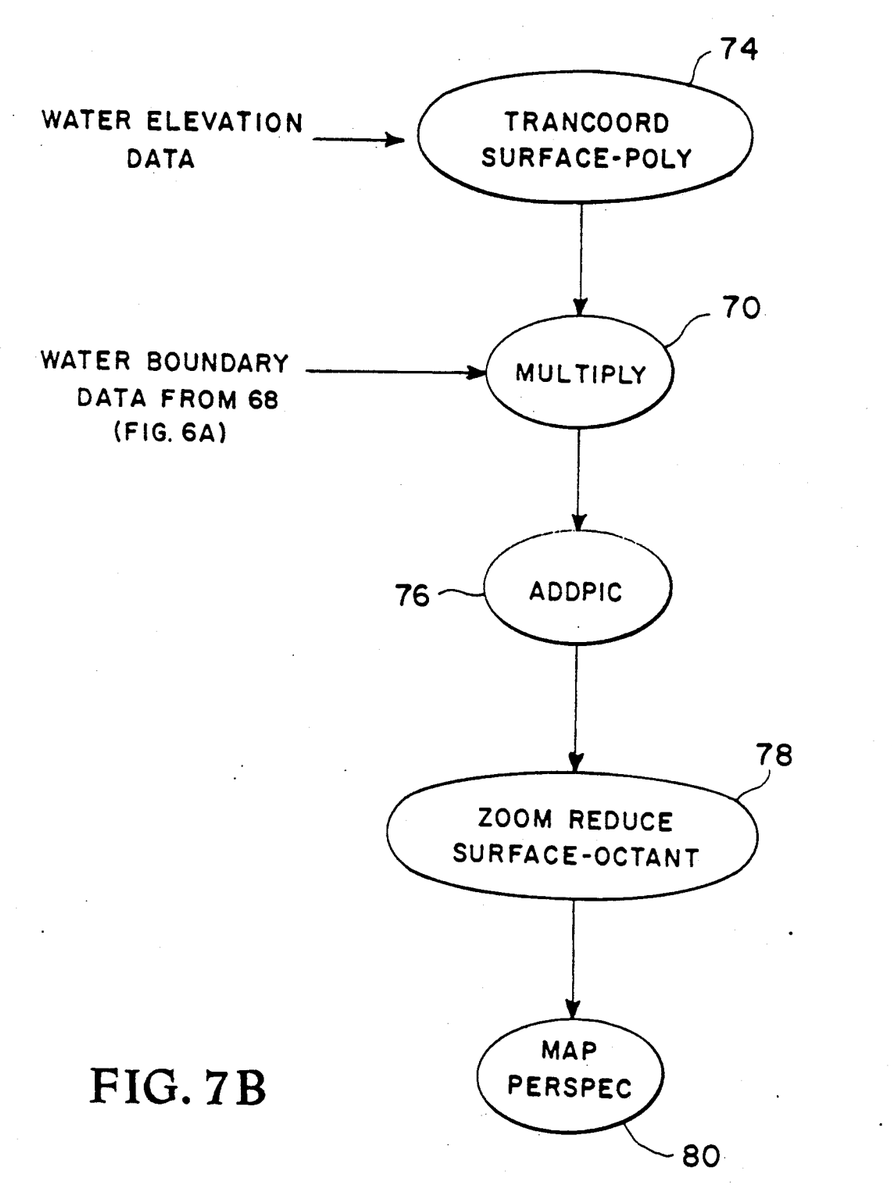

Referring now to FIG. 7B, the water elevation data acquired is operated upon by two programs 74 identified as TRANCORD and SURFACE-POLY. The TRANCORD program converts water level data to an image format registerd to the SAR generated images. The SURFACE-POLY program generates a water elevation surface model which is applied to the MULTIPLY program 70 where each SAR boundary image is merged with its appropriate water elevation model. Next the ADD-PIC program 76 is again run. This merges all of the results of the MULTIPLY program 70 into one image set of real elevation values. Next an interpolation algorithm is provided by two programs identified by reference numeral 78 as ZOOM REDUCE and SURFACE-OCTANT, the first of which operates to reduce the data set to a manageable size, if desired, while the second performs the interpolation and generates a digital elevation model of the survey set.

Finally, a display of the elevation model in a relief map format or perspective view, is performed by a pair of routines shown by reference numeral 80 and identified as MAP and PER SPEC.

Thus what is shown and described is an extremely powerful tool which can utilize off the shelf image processing software to generate three dimensional terrain models which would be extremely difficult, if not impossible, to obtain with conventional apparatus and methods.

Having thus shown and described what is at present considered to be the preferred embodiment of the invention, it should be noted that the same has been made by way of illustration and not limitation. Accordingly, all alterations, changes and modifications coming within the spirit and scope of the invention as set forth in the appended claims are herein meant to be included.

I claim:

1. A method of generating topographical terrain model of a flooded region of the earth's surface covered, at least in part, by foliage, comprising the steps of:
   (a) obtaining radar generated surface image data of said region;
   (b) generating a boundary map delineating two different surface types in said region for at least one time period from the radar generated surface data;
   (c) concurrently acquiring water surface elevational data of said region during said time period;
   (d) combining said boundary map with said water surface elevational data;
   (e) generating a multi-dimensional image of said region from the combining of said boundary map with said water surface elevational data;
   said step (a) of obtaining radar generated surface image data and step (c) of acquiring water surface elevational data comprises obtaining and acquiring said data for a plurality of mutually concurrent time periods and wherein step (b) of generating a boundary map comprises generating at least one flood boundary map for each of said time periods;
   (f) geometrically coregistering the flood boundary maps generated in step (b) and then combining the coregistered boundary maps with said water surface elevational data acquired during said time periods; and,
   wherein said step (e) comprises generating a three dimensional water surface model of said region from said water surface elevational data.

2. The method of claim 1 wherein said step (a) of obtaining radar generated surface image data comprises generating said data from an above ground means that could include airborne and spaceborne platforms.

3. The method of claim 2 and wherein said step (c) of acquiring water surface elevational data comprises acquiring said data at ground level.

4. The method of claim 3 and wherein said step (c) of acquiring water surface elevational data comprises obtaining water elevational data at a plurality of sites within said region.

5. The method of claim 2 and wherein said step (c) of acquiring water surface elevational data comprises obtaining said elevational data by means which include ground level, airborne and spaceborne devices, and at a plurality of measurement sites within said region.

6. The method of claim 5 wherein said step (a) of obtaining radar generated surface data further comprises the step of generating at least one synthetic aperture radar image of said region during each time period and converting said image into digital image data, wherein said step (c) of acquiring water surface elevational data of said one surface type further comprises converting said data into digital data and generating a digital elevational water surface model therefrom, and wherein said step (d) of combining comprises digitally merging said radar image data with said elevational water surface model.

7. The method of claim 6 wherein said converting step of step (a) further comprises the steps of, (g) selecting a predetermined number of surface test sites on said radar image;

(h) converting the image data of said test sites into statistical data;

(i) spatially filtering said radar image data; and (j) generating at least one relative brightness map from the statistical data of said test sites from which said flood boundary map in step (b) is generated.

8. The method of claim 7 wherein step (b) includes digital bit masking of the image data and wherein second type surface data is strapped off for delineating the boundary of said two surface types.

9. The method of claim 6 wherein said step (c) of generating a digital elevational water surface model includes performing a digital interpolation algorithm to generate a multi-dimensional elevational water surface model.

10. The method of claim 6 wherein step (e) of generating said multi-dimensional image of said region includes performing a digital interpolation algorithm on the merged radar image data and the water surface elevational data.

11. The method of claim 7 wherein said one surface type comprises a water surface that can include a flooded land surface and the other surface type comprises a relatively dry land surface that can include a non-flooded land surface, and wherein said boundary maps indicate respective land edge which includes flooded/non-flooded boundaries therebetween 12. A method of generating a topographical terrain model of a flooded region of the earth's surface covered, at least in part, by foliage, comprising the steps of:

(a) obtaining radar generated surface image data of said region;

(b) delineating and generating data corresponding to the flood boundary of said region for at least one time period from the radar generated surface data;

(c) concurrently acquiring water surface elevational data of said region during said time period;

(d) merging the flood boundary data with the water surface elevational data;

(e) generating a multi-dimensional terrain model of said region from the merging of the flood boundary data with the water surface elevational data;

said steps (a) and (c) comprise obtaining and acquiring data for a plurality of concurrent time periods;

step (b) includes the step:

(f) of coregistering the respective flood boundaries for said time periods; and, additionally including the step:

(g) of generating a three dimensional water surface model from the water surface elevational data acquired for said same time periods.

13. The method of claim 12 wherein said step (a) of obtaining radar generated surface image data comprises generating said image data with a synthetic aperture radar.

14. The method of claim 13 wherein said radar has a foliage penetrating operating characteristic.

15. The method of claim 12 wherein said step (c) of acquiring the water surface elevational data comprises obtaining said data at ground level.

16. The method of claim 12 wherein said step (c) of acquiring the water surface elevational data comprises acquiring said data from an above ground means that could include airborne and spaceborne platforms.

17. The method of claim 12 wherein said step (a) further comprises the step of, (h) selecting a predetermined number of ground truth test sites within said region on said radar image;

(i) converting the image data of said test sites into statistical data;

(j) spatially filtering said radar image data; and (k) generating at least one relative brightness map from the statistical data of said test sites from which said boundary map in step (b) is generated.

* * * * *